United States Patent
Hanna (10) Patent No.: US 10,043,229 B2
(45) Date of Patent: Aug. 7, 2018

(54) METHOD FOR CONFIRMING THE IDENTITY OF AN INDIVIDUAL WHILE SHIELDING THAT INDIVIDUAL'S PERSONAL DATA

(75) Inventor: Keith J. Hanna, New York, NY (US)

(73) Assignee: Eyelock LLC, New York, NY (US)

( * ) Notice: Subject to any disclaimer, the term of this patent is extended or adjusted under 35 U.S.C. 154(b) by 1438 days.

(21) Appl. No.: 13/055,961

(22) Filed: Jan. 26, 2011

(65) Prior Publication Data
US 2015/0039527 A1 Feb. 5, 2015

(51) Int. Cl.
*G06Q 40/08* (2012.01)
*G06Q 10/10* (2012.01)
(Continued)

(52) U.S. Cl.
CPC ......... *G06Q 50/265* (2013.01); *G06Q 10/105* (2013.01); *H04L 63/0861* (2013.01); *G06K 2009/00953* (2013.01)

(58) Field of Classification Search
CPC ............................ G06Q 10/105; G06Q 50/265
(Continued)

(56) References Cited

U.S. PATENT DOCUMENTS 4,641,349 A 2/1987 Flom et al.
5,259,040 A 11/1993 Hanna
(Continued)

FOREIGN PATENT DOCUMENTS

JP  2007-034735 A  2/2007
KR  10-2002-0023310 A  3/2002
(Continued)

OTHER PUBLICATIONS

Daugman, John, "How Iris Recognition Works," IEEE Transaction on Circuits and Systems for Video Technology, vol. 14, No. 1, pp. 21-30 (Jan. 2004).
(Continued)

*Primary Examiner* — Jonathan P Ouellette
(74) *Attorney, Agent, or Firm* — Foley & Lardner LLP (57) ABSTRACT

A method for confirming the identity of an individual while shielding that individual's personal data. At least one biometric such as the image of the iris of an individual is captured and stored in a database. A unique identification code is assigned to the biometric without reference to the first individual's personal information. A subsequent biometric data collect is compared with the contents of the database. If a match between the subsequent biometric is found with the original biometric, the system transmits the identification code corresponding to the matched biometric. In a second aspect of the invention, in order to protect the privacy of individuals, the unique identification code is encrypted such that only the individual to whom the biometric belongs holds the de-encryption key. In a third aspect of the invention also intended to protect the privacy of individuals, a non-unique group identification code is assigned to the biometric. Preferably, in the case where the biometric used is the iris, the system replaces enrollment and live iris images with iris templates and bases comparisons on these templates, rather than storing/comparing actual images. The system is adapted to assist in locating missing persons and in verifying transactions. If an individual is missing and a live iris template is matched to that person's stored template, the system automatically contacts another individual.

10 Claims, 3 Drawing Sheets

(51) Int. Cl.
*G06F 21/31* (2013.01)
*G06Q 50/26* (2012.01)
*H04L 29/06* (2006.01)
*G06K 9/00* (2006.01)

(58) Field of Classification Search
USPC .................................................. 705/1.1–912
See application file for complete search history.

(56) References Cited

U.S. PATENT DOCUMENTS

| | | |
|---|---|---|
| 5,291,560 A | 3/1994 | Daugman |
| 5,488,675 A | 1/1996 | Hanna |
| 5,572,596 A | 11/1996 | Wildes et al. |
| 5,581,629 A | 12/1996 | Hanna et al. |
| 5,613,012 A | 3/1997 | Hoffman et al. |
| 5,615,277 A | 3/1997 | Hoffman |
| 5,737,439 A | 4/1998 | Lapsley et al. |
| 5,751,836 A | 5/1998 | Wildes et al. |
| 5,764,789 A | 6/1998 | Pare et al. |
| 5,802,199 A | 9/1998 | Pare et al. |
| 5,805,719 A | 9/1998 | Pare et al. |
| 5,838,812 A | 11/1998 | Pare et al. |
| 5,901,238 A | 5/1999 | Matsushita |
| 5,953,440 A | 9/1999 | Zhang et al. |
| 5,978,494 A | 11/1999 | Zhang |
| 6,021,210 A | 2/2000 | Camus et al. |
| 6,028,949 A | 2/2000 | McKendall |
| 6,055,322 A | 4/2000 | Salganicoff et al. |
| 6,064,752 A | 5/2000 | Rozmus et al. |
| 6,069,967 A | 5/2000 | Rozmus et al. |
| 6,088,470 A | 7/2000 | Camus et al. |
| 6,144,754 A | 11/2000 | Okano et al. |
| 6,192,142 B1 | 2/2001 | Pare et al. |
| 6,246,751 B1 | 6/2001 | Bergl et al. |
| 6,247,813 B1 | 6/2001 | Kim et al. |
| 6,252,977 B1 | 6/2001 | Salganicoff et al. |
| 6,289,113 B1 | 9/2001 | McHugh et al. |
| 6,366,682 B1 | 4/2002 | Hoffman et al. |
| 6,373,968 B2 | 4/2002 | Okano et al. |
| 6,377,699 B1 | 4/2002 | Musgrave et al. |
| 6,424,727 B1 | 7/2002 | Musgrave et al. |
| 6,483,930 B1 | 11/2002 | Musgrave et al. |
| 6,532,298 B1 | 3/2003 | Cambier et al. |
| 6,542,624 B1 | 4/2003 | Oda |
| 6,546,121 B1 | 4/2003 | Oda |
| 6,554,705 B1 | 4/2003 | Cumbers |
| 6,594,376 B2 | 7/2003 | Hoffman et al. |
| 6,594,377 B1 | 7/2003 | Kim et al. |
| 6,652,099 B2 | 11/2003 | Chae et al. |
| 6,700,998 B1 * | 3/2004 | Murata ............. G06K 9/00597 382/115 |
| 6,714,665 B1 | 3/2004 | Hanna et al. |
| 6,760,467 B1 | 7/2004 | Min et al. |
| 6,819,219 B1 | 11/2004 | Bolle et al. |
| 6,850,631 B1 | 2/2005 | Oda et al. |
| 6,917,695 B2 | 7/2005 | Teng et al. |
| 6,944,318 B1 | 9/2005 | Takata et al. |
| 6,950,536 B2 | 9/2005 | Houvener |
| 6,980,670 B1 | 12/2005 | Hoffman et al. |
| 6,985,608 B2 | 1/2006 | Hoffman et al. |
| 7,007,298 B1 | 2/2006 | Shinzaki et al. |
| 7,020,351 B1 | 3/2006 | Kumar et al. |
| 7,047,418 B1 | 5/2006 | Ferren et al. |
| 7,095,901 B2 | 8/2006 | Lee et al. |
| 7,146,027 B2 | 12/2006 | Kim et al. |
| 7,152,782 B2 | 12/2006 | Shenker et al. |
| 7,248,719 B2 | 7/2007 | Hoffman et al. |
| 7,271,939 B2 | 9/2007 | Kono |
| 7,346,472 B1 | 3/2008 | Moskowitz et al. |
| 7,385,626 B2 | 6/2008 | Aggarwal et al. |
| 7,398,925 B2 | 7/2008 | Tidwell et al. |
| 7,414,737 B2 | 8/2008 | Cottard et al. |
| 7,418,115 B2 | 8/2008 | Northcott et al. |
| 7,428,320 B2 | 9/2008 | Northcott et al. |
| 7,542,590 B1 | 6/2009 | Robinson et al. |
| 7,545,962 B2 | 6/2009 | Peirce et al. |
| 7,558,406 B1 | 7/2009 | Robinson et al. |
| 7,558,407 B2 | 7/2009 | Hoffman et al. |
| 7,574,021 B2 | 8/2009 | Matey |
| 7,583,822 B2 | 9/2009 | Guillemot et al. |
| 7,606,401 B2 | 10/2009 | Hoffman et al. |
| 7,616,788 B2 | 11/2009 | Hsieh et al. |
| 7,639,840 B2 | 12/2009 | Hanna et al. |
| 7,660,700 B2 | 2/2010 | Moskowitz et al. |
| 7,693,307 B2 | 4/2010 | Rieul et al. |
| 7,697,786 B2 | 4/2010 | Camus et al. |
| 7,715,595 B2 | 5/2010 | Kim et al. |
| 7,719,566 B2 | 5/2010 | Guichard |
| 7,770,019 B2 | 8/2010 | Ferren et al. |
| 7,797,606 B2 | 9/2010 | Chabanne |
| 7,801,335 B2 | 9/2010 | Hanna et al. |
| 7,847,688 B2 | 12/2010 | Bernard et al. |
| 7,869,627 B2 | 1/2011 | Northcott et al. |
| 7,925,059 B2 | 4/2011 | Hoyos et al. |
| 7,929,017 B2 | 4/2011 | Aggarwal et al. |
| 7,929,732 B2 | 4/2011 | Bringer et al. |
| 7,949,295 B2 | 5/2011 | Kumar et al. |
| 7,949,494 B2 | 5/2011 | Moskowitz et al. |
| 7,978,883 B2 | 7/2011 | Rouh et al. |
| 8,009,876 B2 | 8/2011 | Kim et al. |
| 8,025,399 B2 | 9/2011 | Northcott et al. |
| 8,028,896 B2 | 10/2011 | Carter et al. |
| 8,090,246 B2 | 1/2012 | Jelinek |
| 8,092,021 B1 | 1/2012 | Northcott et al. |
| 8,132,912 B1 | 3/2012 | Northcott et al. |
| 8,159,328 B2 | 4/2012 | Luckhardt |
| 8,170,295 B2 | 5/2012 | Fujii et al. |
| 8,181,858 B2 | 5/2012 | Carter et al. |
| 8,195,044 B2 | 6/2012 | Hanna et al. |
| 8,212,870 B2 | 7/2012 | Hanna et al. |
| 8,214,175 B2 | 7/2012 | Moskowitz et al. |
| 8,233,680 B2 | 7/2012 | Bringer et al. |
| 8,243,133 B1 | 8/2012 | Northcott et al. |
| 8,260,008 B2 | 9/2012 | Hanna et al. |
| 8,279,042 B2 | 10/2012 | Beenau et al. |
| 8,280,120 B2 | 10/2012 | Hoyos et al. |
| 8,289,390 B2 | 10/2012 | Aggarwal et al. |
| 8,306,279 B2 | 11/2012 | Hanna |
| 8,317,325 B2 | 11/2012 | Raguin et al. |
| 8,364,646 B2 | 1/2013 | Hanna et al. |
| 8,411,909 B1 | 4/2013 | Zhao et al. |
| 8,442,339 B2 | 5/2013 | Martin et al. |
| 8,443,202 B2 | 5/2013 | White et al. |
| 8,553,948 B2 | 10/2013 | Hanna |
| 8,604,901 B2 | 12/2013 | Hoyos et al. |
| 8,606,097 B2 | 12/2013 | Hanna et al. |
| 8,719,584 B2 | 5/2014 | Mullin |
| 2005/0077349 A1 * | 4/2005 | Bonalle .................. G06Q 10/04 235/380 |
| 2005/0084137 A1 | 4/2005 | Kim et al. |
| 2005/0084179 A1 | 4/2005 | Hanna et al. |
| 2005/0218215 A1 * | 10/2005 | Lauden ........................ 235/380 |
| 2006/0028552 A1 | 2/2006 | Aggarwal et al. |
| 2006/0073449 A1 | 4/2006 | Kumar et al. |
| 2006/0074986 A1 | 4/2006 | Mallalieu et al. |
| 2006/0157559 A1 * | 7/2006 | Levy et al. .................... 235/380 |
| 2006/0267753 A1 * | 11/2006 | Hussey et al. ................ 340/505 |
| 2006/0279630 A1 | 12/2006 | Aggarwal et al. |
| 2007/0078908 A1 * | 4/2007 | Rohatgi .................. G06Q 10/08 |
| 2007/0083444 A1 * | 4/2007 | Matthews .............. G06Q 10/04 705/30 |
| 2007/0093234 A1 * | 4/2007 | Willis .................. G06F 21/6245 455/410 |
| 2007/0110285 A1 | 5/2007 | Hanna et al. |
| 2007/0206839 A1 | 9/2007 | Hanna et al. |
| 2007/0211922 A1 | 9/2007 | Crowley et al. |
| 2008/0122578 A1 | 5/2008 | Hoyos et al. |
| 2008/0130957 A1 * | 6/2008 | Small .......................... 382/115 |
| 2008/0291279 A1 | 11/2008 | Samarasekera et al. |
| 2009/0074256 A1 | 3/2009 | Haddad |
| 2009/0097715 A1 | 4/2009 | Cottard et al. |
| 2009/0124376 A1 * | 5/2009 | Kelly .................. G07F 17/3206 463/29 |

(56) References Cited

U.S. PATENT DOCUMENTS

| | | |
|---|---|---|
| 2009/0161925 A1 | 6/2009 | Cottard et al. |
| 2009/0178125 A1* | 7/2009 | Barber .................... G06F 21/31 726/6 |
| 2009/0179417 A1* | 7/2009 | Murra .................. B42D 25/309 283/77 |
| 2009/0189736 A1* | 7/2009 | Hayashi ....................... 340/5.81 |
| 2009/0231096 A1 | 9/2009 | Bringer et al. |
| 2009/0274345 A1 | 11/2009 | Hanna et al. |
| 2010/0014720 A1 | 1/2010 | Hoyos et al. |
| 2010/0021016 A1 | 1/2010 | Cottard et al. |
| 2010/0074477 A1 | 3/2010 | Fujii et al. |
| 2010/0127826 A1 | 5/2010 | Saliba et al. |
| 2010/0232655 A1 | 9/2010 | Hanna |
| 2010/0246903 A1 | 9/2010 | Cottard |
| 2010/0253816 A1 | 10/2010 | Hanna |
| 2010/0278394 A1 | 11/2010 | Raguin et al. |
| 2010/0310070 A1 | 12/2010 | Bringer et al. |
| 2011/0002510 A1 | 1/2011 | Hanna |
| 2011/0007949 A1 | 1/2011 | Hanna et al. |
| 2011/0119111 A1 | 5/2011 | Hanna |
| 2011/0119141 A1 | 5/2011 | Hoyos et al. |
| 2011/0158486 A1 | 6/2011 | Bringer et al. |
| 2011/0194738 A1 | 8/2011 | Choi et al. |
| 2011/0211054 A1 | 9/2011 | Hanna et al. |
| 2011/0277518 A1 | 11/2011 | Lais et al. |
| 2012/0127295 A9 | 5/2012 | Hanna et al. |
| 2012/0187838 A1 | 7/2012 | Hanna |
| 2012/0190386 A1* | 7/2012 | Anderson .................. 455/456.3 |
| 2012/0212597 A1 | 8/2012 | Hanna |
| 2012/0219279 A1 | 8/2012 | Hanna et al. |
| 2012/0239458 A9 | 9/2012 | Hanna |
| 2012/0240223 A1 | 9/2012 | Tu |
| 2012/0242820 A1 | 9/2012 | Hanna et al. |
| 2012/0242821 A1 | 9/2012 | Hanna et al. |
| 2012/0243749 A1 | 9/2012 | Hanna et al. |
| 2012/0257797 A1 | 10/2012 | Leyvand et al. |
| 2012/0268241 A1 | 10/2012 | Hanna et al. |
| 2012/0293643 A1 | 11/2012 | Hanna |
| 2012/0300052 A1 | 11/2012 | Hanna et al. |
| 2012/0300990 A1 | 11/2012 | Hanna et al. |
| 2012/0321141 A1 | 12/2012 | Hoyos et al. |
| 2012/0328164 A1 | 12/2012 | Hoyos et al. |
| 2013/0051631 A1 | 2/2013 | Hanna |
| 2013/0110859 A1 | 5/2013 | Hanna et al. |
| 2013/0162798 A1 | 6/2013 | Hanna et al. |
| 2013/0162799 A1 | 6/2013 | Hanna et al. |
| 2013/0182093 A1 | 7/2013 | Hanna |
| 2013/0182094 A1 | 7/2013 | Hanna |
| 2013/0182095 A1 | 7/2013 | Hanna |
| 2013/0182913 A1 | 7/2013 | Hoyos et al. |
| 2013/0182915 A1 | 7/2013 | Hanna |
| 2013/0194408 A1 | 8/2013 | Hanna et al. |
| 2013/0212655 A1 | 8/2013 | Hoyos et al. |
| 2013/0294659 A1 | 11/2013 | Hanna et al. |
| 2014/0064574 A1 | 3/2014 | Hanna et al. |
| 2014/0072183 A1 | 3/2014 | Hanna et al. |

FOREIGN PATENT DOCUMENTS

| | | |
|---|---|---|
| KR | 10-2002-0042241 A | 6/2002 |
| KR | 1020020078225 | 10/2002 |
| KR | 1020030005113 | 1/2003 |
| KR | 1003738500000 | 2/2003 |
| KR | 1020030034258 | 5/2003 |
| KR | 1020030051970 | 6/2003 |
| KR | 2003216700000 | 7/2003 |
| KR | 1004160650000 | 1/2004 |
| KR | 2003402730000 | 1/2004 |
| KR | 2003411370000 | 1/2004 |
| KR | 2003526690000 | 5/2004 |
| KR | 2003552790000 | 6/2004 |
| KR | 2003620320000 | 9/2004 |
| KR | 2003679170000 | 11/2004 |
| KR | 1020050005336 | 1/2005 |
| KR | 2003838080000 | 5/2005 |
| KR | 1020050051861 | 6/2005 |
| KR | 2004046500000 | 12/2005 |
| KR | 1005726260000 | 4/2006 |
| KR | 10-2008-0023282 A | 3/2008 |
| KR | 1011976780000 | 10/2012 |
| KR | 1013667480000 | 2/2014 |
| KR | 1013740490000 | 3/2014 |
| KR | 1020140028950 | 3/2014 |
| KR | 1020140039803 | 4/2014 |
| KR | 1020140050501 | 4/2014 |
| WO | WO 2010/030431 A2 | 3/2010 |
| WO | WO-2010/062371 | 6/2010 |
| WO | WO-2011/093538 | 8/2011 |

OTHER PUBLICATIONS

International Preliminary Report on Patentability in International Application No. PCT/US2009/049121, dated Jan. 5, 2011, 4 pages.

Written Opinion of the International Searching Authority in International Application No. PCT/US2009/049121, dated Mar. 31, 2010, 3 pages.

International Search Report in International Application No. PCT/US2009/049121, dated Mar. 31, 2010, 3 pages.

B. Galvin, et al., Recovering Motion Fields: An Evaluation of Eight Optical Flow Algorithms, Proc. of the British Machine Vision Conf. (1998).

J. R. Bergen, et al., Hierarchical Model-Based Motion Estimation, European Conf. on Computer Vision (1993).

K. Nishino, et al., The World in an Eye, IEEE Conf. on Pattern Recognition, vol. 1, at pp. 444-451 (Jun. 2004).

R. Kumar, et al., Direct recovery of shape from multiple views: a parallax based approach, 12th IAPR Int'l Conf. on Pattern Recognition.

R. P. Wildes, Iris Recognition: An Emerging Biometric Technology, Proc. IEEE 85(9) at pp. 1348-1363 (Sep. 1997).

* cited by examiner

METHOD FOR CONFIRMING THE IDENTITY OF AN INDIVIDUAL WHILE SHIELDING THAT INDIVIDUAL'S PERSONAL DATA

RELATED APPLICATIONS

Priority is claimed from U.S. Provisional Application No. 61/076,303 filed Jun. 27, 2008, the entirety of which is incorporated by reference herein.

BACKGROUND OF THE INVENTION

Field of the Invention

The invention is related biometric identity verification, and more particularly to methods and systems of verifying one's identity without giving away the very identity information one is seeking to protect.

Description of Related Art

Biometric technologies such as fingerprint, face and iris recognition have been available for many years, but they have not been used in a widespread fashion, other than in select deployments for very specific applications.

One of the reasons for lack of widespread use is the perceived concern over loss of privacy in case such biometric information is misused or lost. Ironically, these concerns come at the same time as millions of personal credit card numbers, which are a widely-accepted means of performing transactions, are being lost and used fraudulently. Biometry is an otherwise excellent means of ensuring a person's identity during commercial transactions, yet people are reluctant to enroll in the first place.

Another area in which biometrics can be of great assistance is in locating missing children.

As reported by the Office of Juvenile Justice and Delinquency Prevention, a child goes missing every 40 seconds in the US, which is over 2,100 children per day. Another 500,000 go missing without ever being reported.

The problem of missing children is complex. There are different types of missing children including family abductions; endangered runaways; non-family abductions; and lost, injured, or otherwise missing children. Regardless of these categories, most of the missing children go through different processes (natural, voluntary, or forced) at the end of which their identity on paper (name, home address, state, even residence country etc.) is changed. This weakens the chances of law enforcement and parents locating them and their safe return home.

An estimated 3,200 to 4,600 short-term, nonfamily abductions are reported to law enforcement annually. Of these, an estimated 200 to 300 are "stereotypical kidnappings" where a child is gone overnight, killed, or transported a distance of 50 miles or more or where the perpetrator intended to keep the child permanently.

Consequently, the child might end up leaving the state or even the country, in which case, the absence of interstate or inter-country communication and database of missing children becomes a major hurdle in their recovery by law enforcement and their subsequent return to home.

The National Incidence Studies of Missing, Abducted, Runaway and Thrownaway Children in America (NISMART) reported that there are an estimated 354,100 family abductions annually in the United States. Indeed 46% of these (an estimated 163,200 abductions) involve concealment of the child, transportation of the child out of state, or an intent by the abductor to keep the child indefinitely or to permanently alter custody. Of this more serious category of abductions, approximately half are perpetrated by men who were either noncustodial fathers or father figures. Most victims are children ranging in age from 2-11. Half involve unauthorized takings and half involve failures to return the child after an authorized visit or stay. 15% of the abductions involve the use of force or violence. A substantial 75-85% involves interstate transportation of the child.

It is not uncommon for child victims of family abduction to have their names and appearances altered. They are often told lies about the abduction and left-behind parent. Sometimes they are even told that the left-behind parent is dead.

No matter the events that led a child to be categorized as missing, the typical first and foremost step in law enforcement agencies' recovery and return efforts is positive identification. Traditional methods involve manual check of photographs, ID documents, interviews and such like. These are often time-consuming, not accurate, subject to human error and can be misleading (e.g. name change, change of a child's face due to aging). It is crucial that the means of identification does and cannot change over time and cannot be changed.

Moreover, the absence of a centralized global database of missing children that is shared and fed by law enforcement agencies hampers recovery efforts in the case of international kidnappings, or even interstate occurrences.

For efficiency purposes, such database should hold identification data, as well as information on parents, home address, phone number, notes on a critical medical condition of the child (if any), etc.

Considering the fragile state of the child, as well as the parents, the identification process should be completed in a speedy manner.

There are several problems however with existing methods for recovering lost children. A first problem is that many parents are unwilling to provide to a central registry the name, address and other personal information associated to their children. Databases are often reported in the media as being lost or left in public places, and this can be a disincentive for parents to provide such full information required today for identification. A second problem is that any child-lost recovery system is only as good as (i) the number of children enrolled, and (ii) the number of law enforcement officials that actively use the system to locate lost children. Current systems are not used in a widespread fashion because they use technical and business methods that are not conducive to widespread enrollment or use by law enforcement personnel.

SUMMARY OF THE INVENTION

We have developed a method for encouraging biometric use that enables 4 basic capabilities:
A. It allows users to optionally not store their name or any other identifying information with the biometric.
B. It allows users to freely retrieve and check the information associated to their account, without complicated login procedures that would normally be required for access to information based on biometrics. This free access to the user's account information takes away the mystique of biometrics, much like swiping a rapid-transit card provides the current account balance on the card without a complicated transactional process.
C. It deters abuse by malicious-intent of workers within the biometric service provider. Many staff ranging from cinema-staff to garage gas salesman have no need to access your personal information—they just need to know that you have sufficient funds left in your account.

D. It overcomes privacy laws in certain jurisdictions that prevents biometric information with personal identifying information being passed from one jurisdiction to the next.

The inventive method and system is applicable for many different biometric applications, such as verifying transactions, identifying missing persons, and the like.

The invention is a method for confirming the identity of an individual while shielding that individual's personal data. In one aspect of the invention, at least one image of the iris of a first individual is captured and stored in a central database. A unique identification code is assigned to the iris image without reference to the first individual's personal information. Subsequent iris images are compared with the contents of the central database. If a match between the subsequent iris image is found with a stored iris image, the unique identification code corresponding to the matched stored iris image is transmitted to a relevant entity.

The unique identification code may be transmitted to at least one of the first individual, the first individual's parent or guardian, or a law enforcement individual. In addition or in the alternative, the unique identification code may be broadcast over a network, e.g., in a manner similar to an Amber Alert, however without giving away any personal information of the missing person. In the case of a missing person, another individual (e.g., parent or guardian) registers with the central database that the first individual is missing and provides contact information of a second individual to be associated with the first individual's stored iris image. Subsequent iris images are captured and compared to the contents of the database. When a match is made in the comparing step, the second individual is automatically contacted via the provided contact information.

In a second aspect of the invention, in order to overcome potential privacy regulations that limit the flow of biometric information between countries, the unique identification code is only made available to the individual from whom the biometric data was collected. In a third aspect of the invention, also to overcome potential privacy regulations, the identification code is not unique but is assigned to groups of individuals based on non-personal information such as a flight number or a time period.

The invention may also be used to verify the identities of individuals wishing to complete a commercial transaction. In one example, a physical object such as a card is issued to an individual bearing the unique identification code mentioned above. The individual submits to an iris scan at the merchant's location to generate a live iris image which is compared to the contents of the database. If a match is found, the unique identification code is transmitted to the merchant. If a match is found between the transmitted identification code and the identification code on the physical object presented by the individual at the merchant, authorization of the transaction by the merchant is enabled.

In addition or in the alternative to storing and comparing iris images, all captured iris images (i.e., enrollment and live verification images) may be replaced with iris templates corresponding to the iris image.

DETAILED DESCRIPTION OF THE INVENTION

Figure 1:
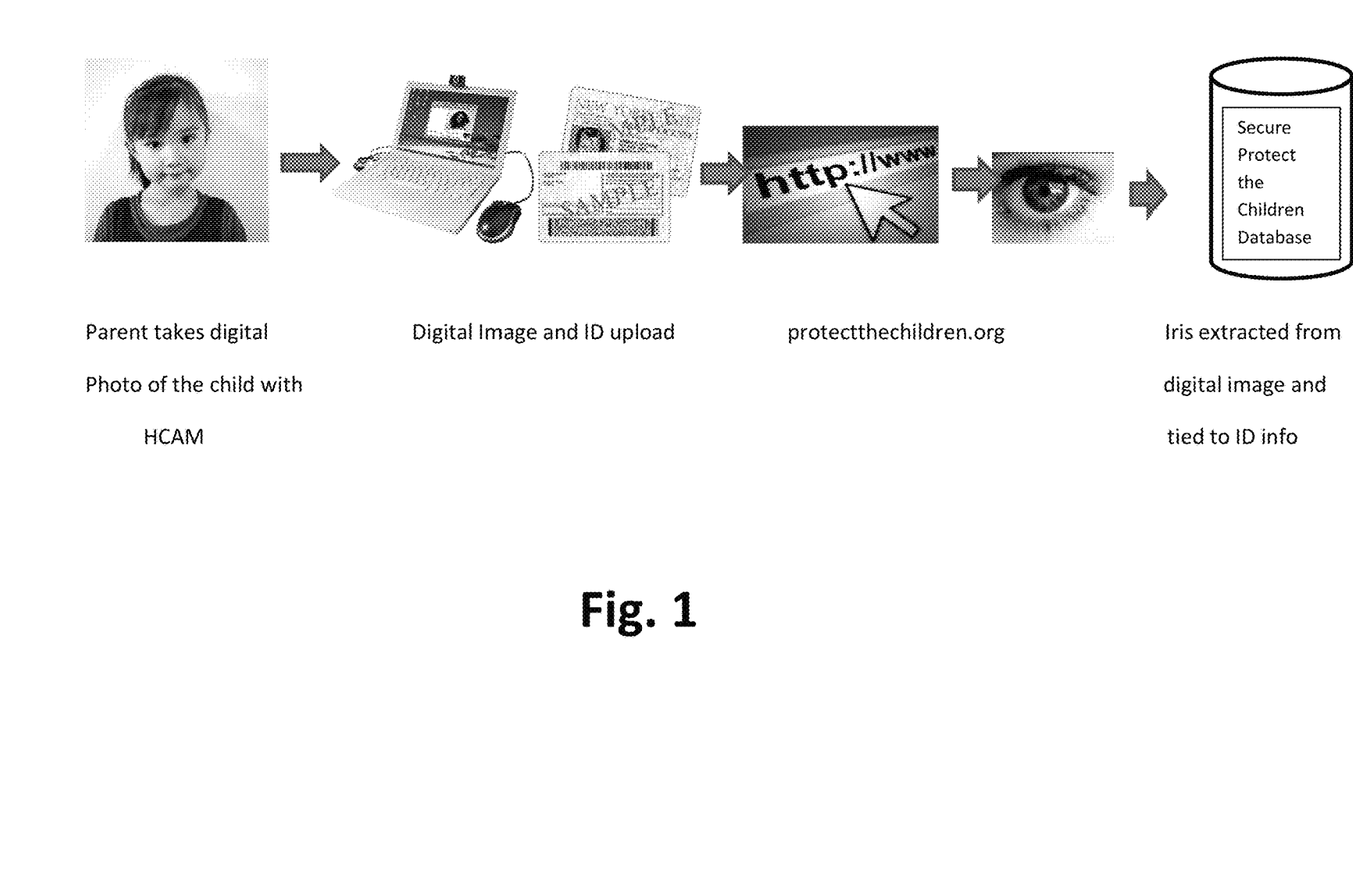
FIG. 1 is a flow chart depicting an enrollment method in accordance with the invention.
Figure 2:
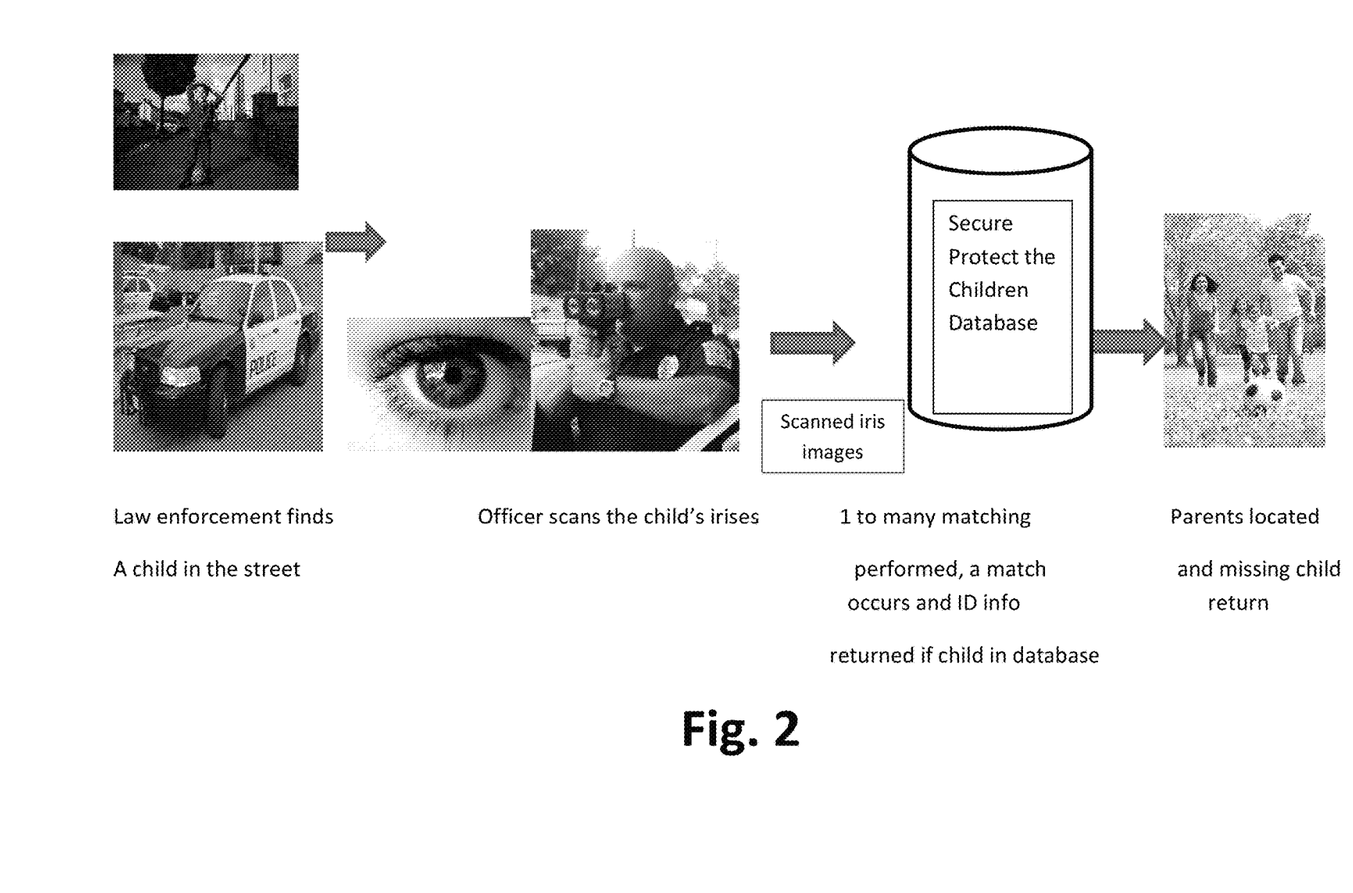
FIG. 2 is a flow chart depicting an identification/verification method in accordance with the invention.

Description of the invention will now be given with reference to FIGS. 1-3. It should be understood that these figures are exemplary in nature and in no way serve to limit the scope of the invention, which is defined by the claims appearing hereinbelow.

The invention is a method to be offered to the public at a small one-time enrollment fee (e.g., approximately $100 per user), and an even smaller ($5-$10) yearly recurring charge per person, and at no or nominal cost to law-enforcement agencies. Participating merchants are preferably charged a fee, as they are at significant risk of lost merchandise and services during fraudulent transactions. It does not require any capital investment in infrastructure while parents and law enforcement only need to have a webcam for acquiring images of the iris of the eye easily and unobtrusively. Alternatively, the parent could take advantage of enrollment locations.

The inventive system includes novel technical and business method components that encourage parents to enroll their children and/or individuals to enroll themselves, and at the same time encourages law-enforcement officials to use the system while substantially preventing the abuse of the information contained therein.

The system works by the parent simply taking a digital picture of a child's face with the webcam either at home or at an enrollment center. The image is uploaded to the web site, at which point the system extracts irises and optionally fuses them to the child's face as well as the iris and face of the parents.

Parents/users have two methods for enrolling their child or themselves. In the first method, upon enrollment the first time, a parent must provide a child's birth certificate and his or her own driver's license to validate chain of custody identity with their children, before the biometric records are permanently fused in the database. In the second method, a parent simply submits images of the irises of their child, and the back-end server produces a random number that is unique.

The system creates a reference database of users' iris images. Each iris image is assigned a unique numeric code, which is optionally tied to personal information data kept in the database as discussed above or, more preferably, not tied to any personal information whatsoever.

An important element in the enrollment process is the ability of the user to verify that the system is working. This is performed by the user executing almost the identical steps that a law enforcement agent would perform if their child were lost or that a merchant would perform to verify a transaction. In the first enrollment method described above, these steps are: (i) the parent re-scans their child's irises, without any numeric or name data, (ii) the back-end server performs a search, and (iii) reports the unique number assigned by the back-end server when the child was enrolled. Name and other identifying information that could have been assigned to the child are not reported at this time, as a disincentive for criminals to get name and address information of children by taking their pictures and sending them to the system. By this verification method, parents have a strong incentive to enroll their child since (i) the child's name and address need not necessarily be provided during enrollment, (ii) the parent can immediately or periodically check that the system is working by submitting images of their children's irises, (iii) during the verification step just described, name and address or other identifying information is not provided thereby completely neutralizing the danger of criminals attempting to obtain name and address information using the system.

When law enforcement officers come across a lost child, his/her irises are scanned with either a mobile webcam on the spot or with a webcam at the station, and then these images are sent to the system iris database for matching. As a disincentive for abuse by law-enforcement personnel, personal information is not necessarily provided back to the law-enforcement official. For example, a notification may simply be provided that the child has been registered as missing and the unique enrollment number provided to the law enforcement agency. Critically, at the time that the child is reported missing, the parent can decide what information to provide, other than the unique identifying number, in order for law enforcement to contact them. In the few instances whereby a parent has lost the unique number of their child, then they can simply re-submit images of their child's irises stored on their computer, receive new unique code information, and then note that their child is missing.

If a match occurs, then depending on the provisions of local law, the system returns the numeric code assigned to that record and an immediate alert to the registered parent's email address and cell phones notifying of law enforcement's request for information, and requiring permission to "open" the record in question to the requesting law enforcement agency.

If and when permission is granted, law enforcement officers can then immediately refer to the secured database to retrieve personal information of the child who is then positively identified with 100% accuracy.

Only moments pass from the time the officer acquires the iris image of the child, until the database returns the numeric code and informs whether the child is in the system or not.

In a second aspect of the invention, in order to overcome potential privacy regulations that limit the flow of biometric information between countries, the unique identification code is only made available to the individual from whom the biometric data was collected, or the guardian of a child from whom the biometric data was collected. This means that law enforcement or other agencies cannot use the unique identification code to track individuals from one place to the next. This can be implemented by encrypting the unique identification code in the database and the individual from whom the biometric data was collected can hold a private encryption key that is only known to them or, optionally, anyone they authorize. In this way, the individual from whom the biometric data was collected, or the guardian of a child from whom the biometric data was collected, is able to track an individual themselves without law enforcement or other agency being privy to the information. Many encryption methods are known in the art, such as that disclosed in U.S. Pat. No. 6,052,466.

In a third aspect of the invention, also to overcome potential privacy regulations, the identification code is not unique but is assigned to groups of individuals based on information that by itself cannot uniquely identify the individual, such as the number of a flight that an individual is taking, or a number corresponding to the place and a time interval in which the individual was registered, or a number corresponding to the month and year of birth of the individual. We call this non-unique identification code a group identification code. In this aspect of the invention, any individual cannot by definition be uniquely identified, but the invention still serves a very important purpose. First, if no biometric match is found within a particular identification group, then definitively the individual to whom the biometric belongs also does not correspond to that particular identification group. In many applications, this information alone is sufficient to solve a complete identity management solution. For example, in the case of a flight that an individual is taking, then it is typically only sufficient to know that a person does or does not belong to the group that is authorized to be on the flight. In other applications, such as identifying a missing child, then the information that the child is within a group vastly reduces the search for the missing child and allows other investigative techniques to identify the child uniquely. As an example, 10 million children may be registered with 100,000 unique group codes. If a child is reported missing, then the group in which the missing child was enrolled is searched and if a match is found, then additional investigative techniques only need to be used on 10,000,000/100,000=100 individuals to uniquely identify the child.

Biometrics refers to technologies that measure and analyze human body and behavioral characteristics, such as fingerprints, eye retinas and irises, voice patterns, facial patterns, signatures and hand measurements. Put more simply, biometrics are something you are, as opposed to something you know or have (e.g. PIN, passport, ID card).

The accuracy of a biometric in verifying or identifying individuals is determined by the difference between:

A. the similarity between two instances of the same biometric, an individual's face, for example, and B. the similarity between the biometrics of two or more individuals In other words, one is (statistically) guaranteed to pass a test of independence when one of their biometrics is compared with that same biometric from any other person (independence here meaning that the biometric patterns will not match) but one will fail that test of independence when that same biometric is compared with itself (that is to say, the patterns will match, so they will not be independent).

The objective of replacing traditional identification methods with biometrics is reliable automatic recognition of persons; and any biometric is judged by the statistical accuracy in its ability to distinguish between millions of unique individuals.

In that context, iris recognition is proven to be the most accurate biometric. Even the two eyes of one person display independent and uncorrelated iris patterns. Iris patterns are very complex, and the combination of complexity with randomness across a population confers mathematical uniqueness to a given iris pattern. What contemporary iris recognition/identification technology does is extract that random pattern into a compact digital signature that serves as a solid biological identifier. Moreover, the iris is stable over time, whereas the same cannot be said about other conventional biometrics in the market.

For example, in face recognition, difficulties arise from the fact that the face is a changeable social organ displaying a variety of expressions, as well as being an active three-dimensional (3-D) object whose image varies with viewing angle, pose, illumination, accoutrements, and age. It has been shown that, for "mug shot" images taken at least one year apart, even the best current algorithms can have error rates of 43%-50%. Against this intra-class (same face)

variability, inter-class variability is limited because different faces possess the same basic set of features, in the same canonical geometry.

Because the randomness of iris patterns has very high dimensionality, recognition decisions are made with confidence levels high enough to support rapid and reliable exhaustive searches through national-sized databases.

The inventive system utilizes SAMBI® (Software Suite for the Acquisition and Matching at a Distance and in Motion of Multi-modal Biometrics), which is described in co-pending application no. PCT US2008/74737, entitled "System and method for Iris Data Acquisition for Biometric Identification" and filed Aug. 29, 2008, the teachings of which are incorporated by reference herein.

SAMBI's multimodality comes from its utilization of the iris for recognition and the face for redress purposes. Thanks to the iris acquisition and matching element, SAMBI is extremely accurate.

In addition to real-time applications, SAMBI allows the acquisition of iris images from photographs, which, in the case of the inventive method, is vital and renders the registration process seamless to the parent. The parent simply takes a good-quality digital photo of their child with the webcam at home or at any enrollment facility, and the actual iris image acquisition is performed by SAMBI and converted into an iris template Moreover, SAMBI is capable of performing one-to-many matching of the iris biometric within seconds. For example, a webcam enabled by SAMBI can, in real time, process up to 50 moving people per minute.

SAMBI allows for anonymous identification, whereby iris matching is performed without the need for personal information such as a person's name, address, or other similar personal information.

As well as the technical aspects that have been described that have prevented widespread use of such a lost-child system, limitations in current business methods also have prevented widespread use. We have developed a business model that encourages families, law enforcement, operating groups and related commercial and security entities to participate in the program. FIG. 3 shows the business process and financial flow.

Figure 3:
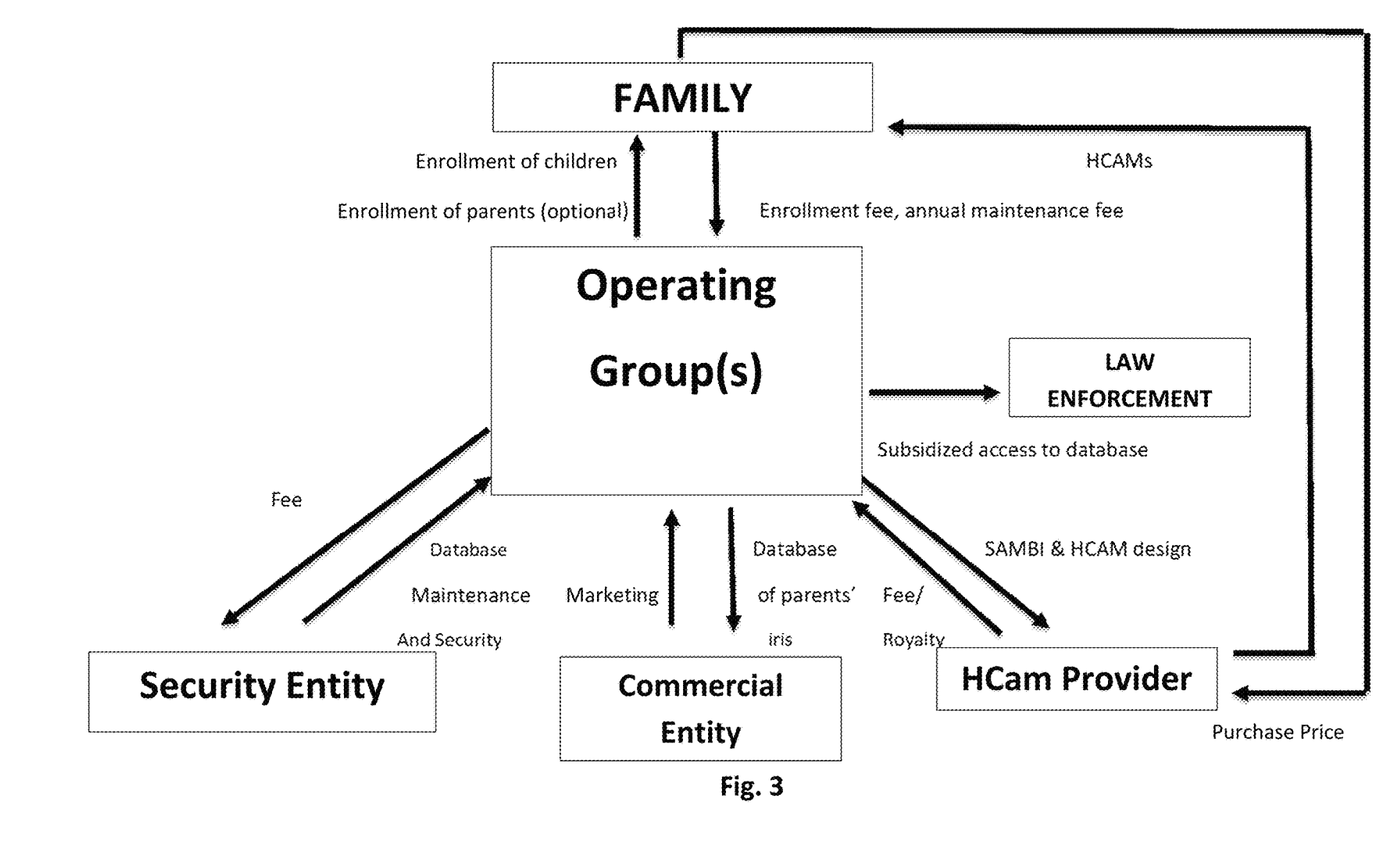
FIG. 3 is a flow chart depicting the overall structure of a system in accordance with the invention.

As shown in FIG. 3, the Operating Group provides the SAMBI software and its specific design of the webcam to an HCAM® Provider for manufacturing and distribution in the market of the webcam, in exchange for royalties for each unit sold. Families are made aware of the service via ads placed by a Commercial Entity, typically as part of their ongoing service, such as within consumer bills.

The Operating Group operates a website designated for the system.

The HCAMs are designed in a way to enable a parent to simply plug it into their computers, and the protect-the-children.org website automatically is accessed through a web browser. The website identifies the camera, associates the family with a unique code that is to be stored with their enrollment information and images. The whole enrollment process is guided by the preinstalled software.

The purchase of a webcam can optionally entitle the parent to the free enrollment of their second child, otherwise a 50% discount of the enrollment fee of their first child. This is achieved with an electronic wallet that is automatically debited with the discount.

Law enforcement officials are provided with HCam devices at a subsidized rate. This reduces the barrier-to-entry to encourage widespread use.

The parent will be given the option of enrolling their own irises with the SAMBI PC software included in the HCAM, for the purpose of logical access control to their computers, but also for the purpose of gaining access to goods and services provided by the Commercial Entity.

Having described certain embodiments of the invention, it should be understood that the invention is not limited to the above description or the attached exemplary drawings. Rather, the scope of the invention is defined by the claims appearing hereinbelow and any equivalents thereof as would be appreciated by one of ordinary skill in the art.

What is claimed is:

1. A method for confirming the identity of an individual while shielding that individual's personal data, comprising the steps of:
   enrolling, by a biometric matching server in communication with a biometric acquisition device and a central database, a first individual by using the biometric acquisition device to acquire iris biometrics of the first individual and storing the iris biometrics in a record of the central database;
   assigning, by the biometric matching server for storage with the iris biometrics in the record, a unique identification code that is different from the iris biometrics, to the iris biometrics without reference to the first individual's personal information;
   storing, by the biometric matching server, the unique identification code with the iris biometrics in the record of the central database;
   performing, by the biometric matching server in communication with the central database, biometric matching of subsequent iris biometrics with contents of the central database including the stored iris biometrics;
   if a match by the biometric matching server between the subsequent iris biometrics is found with the stored iris biometrics responsive to the biometric matching, transmitting, by the biometric matching server, the unique identification code stored with the iris biometrics from the central database to a second individual requesting access to information in the record, and notifying a person authorized to permit access to the information in the record to those having the unique identification code;
   issuing on a physical object to the first individual, the unique identification code;
   when a match is found responsive to the comparing, performing the transmitting by transmitting the unique identification code to a merchant with which the first individual is attempting to make a transaction; and
   when a match is found between the transmitted identification code and the identification code on the physical object presented at the merchant, enabling authorization of the transaction by the merchant.

2. A method for confirming the identity of an individual according to claim 1, said transmitting step further comprising the step of transmitting the unique identification code to at least one of the first individual, the first individual's parent or guardian, or a law enforcement individual.

3. A method for confirming the identity of an individual according to claim 1, further comprising the steps of:
   (i) registering with the central database that the first individual is missing;
   (ii) providing contact information of the second individual to be associated with the first individual's stored iris biometrics;

(iii) capturing the subsequent iris biometrics and comparing the subsequent iris biometrics to the contents of the database; and (iv) when a match is made in the comparing step, automatically contacting the second individual via the provided contact information.

4. A method for confirming the identity of an individual while shielding that individual's personal data, comprising the steps of:

enrolling, by a biometric matching server in communication with a biometric acquisition device and a central database, a first individual by using the biometric acquisition device to acquire iris biometrics of the first individual, and storing the iris biometrics in a record of the central database;

assigning, by the biometric matching server for storage with the iris biometrics in the record, a unique identification code that is different from the iris biometrics, to the stored iris image biometrics without reference to the first individual's personal information;

storing, by the biometric matching server, the unique identification code with the iris biometrics in the record of the central database;

capturing, using the biometric acquisition device, subsequent iris biometrics;

performing, by the biometric matching server in communication with the central database, biometric matching of the subsequent iris biometrics with contents of the central database including the stored iris biometrics;

if a match by the biometric matching server between the subsequent iris biometrics is found with the stored iris biometrics, transmitting, by the biometric matching server, the unique identification code stored with the iris biometrics, from the central database to a second individual requesting access to information in the record, and notifying a person authorized to permit access to the information in the record to those having the unique identification code;

issuing on a physical object to the first individual, the unique identification code;

when a match is found responsive to the comparing, performing the transmitting by transmitting the unique identification code to a merchant with which the first individual is attempting make a transaction; and when a match is found between the transmitted identification code and the identification code on the physical object presented at the merchant, enabling authorization of the transaction by the merchant.

5. A method for confirming the identity of an individual according to claim 4, said transmitting step further comprising the step of transmitting the unique identification code to at least one of the first individual, the first individual's parent or guardian, or a law enforcement individual.

6. A method for confirming the identity of an individual according to claim 4, further comprising the steps of:

(i) registering with the central database that the first individual is missing;

(ii) providing contact information of the second individual to be associated with the first individual's stored iris template;

(iii) capturing the subsequent iris biometrics, and comparing the subsequent iris biometrics to the contents of the database; and (iv) when a match is made in the comparing step, automatically contacting the second individual via the provided contact information.

7. A method for confirming the identity of an individual while shielding that individual's personal data, comprising the steps of:

enrolling, by a biometric matching server in communication with a biometric acquisition device and a central database, a first individual by using the biometric acquisition device to acquire a biometric of the first individual and storing the biometric in a record of the central database;

assigning, by the biometric matching server for storage with the biometric in the record, a non-unique group identification code that is different from the biometric, to the biometric without reference to the first individual's personal information;

storing, by the biometric matching server, the non-unique group identification code with the biometric in the record of the central database;

performing, by the biometric matching server in communication with the central database, biometric matching of subsequent biometric with the contents of the central database including the stored biometric;

if the match by the biometric matching server between the subsequent biometric is found with a stored biometric responsive to the biometric matching, transmitting, by the biometric matching server, the non-unique group identification code stored with the biometric, from the central database to a second individual requesting access to information in the record, and notifying a person authorized to permit access to the information in the record to those having the non-unique group identification code;

issuing on a physical object to the first individual, the non-unique group identification code;

when a match is found responsive to the comparing, performing the transmitting by transmitting the non-unique group identification code to a merchant with which the first individual is attempting to make a transaction; and when a match is found between the transmitted identification code and the non-unique group identification code on the physical object presented at the merchant, enabling authorization of the transaction by the merchant.

8. The method of claim 7 wherein the biometric is the iris.

9. A method for confirming the identity of an individual while shielding that individual's personal data, comprising the steps of:

enrolling, by a biometric matching server in communication with a biometric acquisition device and a central database, a first individual by using the biometric acquisition device to acquire a biometric of the a first individual and storing the biometric in a record of the central database;

assigning, by the biometric matching server for storage with the biometric in the record, a unique identification code that is different from the biometric, to the biometric and encrypting the unique identification code such that only those individuals authorized by the individual to whom the biometric belongs hold the de-encryption key;

storing, by the biometric matching server, the unique identification code with the biometric in the record of the central database;

performing, by the biometric matching server in communication with the central database, biometric matching of subsequent biometric with the contents of the central database including the stored biometric;

if a match by the biometric matching server between the subsequent biometric is found with a stored biometric responsive to the biometric matching, transmitting, by the biometric matching server, the encrypted identification code stored with the biometric, from the central database to a second individual requesting access to information in the record, and notifying a person authorized to permit access to the information in the record to those having the encrypted identification code;

issuing on a physical object to the first individual, the unique identification code;

when a match is found responsive to the comparing, performing the transmitting by transmitting the unique identification code to a merchant with which the first individual is attempting to make a transaction; and when a match is found between the transmitted identification code and the identification code on the physical object presented at the merchant, enabling authorization of the transaction by the merchant.

10. The method of claim 9 wherein the biometric is the iris.

\* \* \* \* \*

UNITED STATES PATENT AND TRADEMARK OFFICE
CERTIFICATE OF CORRECTION

PATENT NO. : 10,043,229 B2  
APPLICATION NO. : 13/055961  
DATED : August 7, 2018  
INVENTOR(S) : Keith J. Hanna Page 1 of 1

It is certified that error appears in the above-identified patent and that said Letters Patent is hereby corrected as shown below:

On the Title Page

Item (30), please insert:
-- PCT Filed: Jun. 29, 2009
PCT No.: PCT/US2009/049121
§ 371 (c) Date: Jan. 26, 2011
PCT Pub. No.: WO2010/030431
PCT Pub. Date: Mar. 18, 2010 --

Item (62), please insert:
-- Related U.S. Application Data
Provisional application No. 61/076,303, filed on Jun. 27, 2008 --

Signed and Sealed this
Twelfth Day of February, 2019

Andrei Iancu
*Director of the United States Patent and Trademark Office*